(12) United States Patent
Niesen et al.

(10) Patent No.: US 9,560,390 B2
(45) Date of Patent: Jan. 31, 2017

(54) ASYNCHRONOUS ENCODING OF DIGITAL CONTENT

(71) Applicant: Alcatel-Lucent USA Inc., Murray Hill, NJ (US)

(72) Inventors: Urs Niesen, Murray Hill, NJ (US); Mohammadali Maddahali, Holmdel, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 59 days.

(21) Appl. No.: 14/324,836

(22) Filed: Jul. 7, 2014

(65) Prior Publication Data

US 2016/0007057 A1    Jan. 7, 2016

(51) Int. Cl.
| | |
|---|---|
| *H04N 5/76* | (2006.01) |
| *H04N 21/231* | (2011.01) |
| *H04N 21/6405* | (2011.01) |
| *H04N 21/2347* | (2011.01) |
| *H04N 21/854* | (2011.01) |
| *H04N 21/262* | (2011.01) |
| *H04N 21/845* | (2011.01) |

(52) U.S. Cl.
CPC .... *H04N 21/23106* (2013.01); *H04N 21/2347* (2013.01); *H04N 21/26216* (2013.01); *H04N 21/26241* (2013.01); *H04N 21/6405* (2013.01); *H04N 21/8456* (2013.01); *H04N 21/854* (2013.01)

(58) Field of Classification Search
USPC .............................................. 725/35, 62, 115
See application file for complete search history.

(56) References Cited

U.S. PATENT DOCUMENTS

| | | | |
|---|---|---|---|
| 9,288,010 B2* | 3/2016 | Luby | H04L 1/0056 |
| 2012/0254459 A1 | 10/2012 | Maddah-Ali | |
| 2013/0111520 A1* | 5/2013 | Lo | H04L 67/306 |
| | | | 725/35 |
| 2014/0207913 A1 | 7/2014 | Maddah-Ali et al. | |

OTHER PUBLICATIONS

Mohammad Ali Maddah-Ali et al., "Fundamental Limits of Caching", 2013 IEEE International Symposium on Information Theory Proceedings (ISIT), Jul. 7, 2013, 19 pages.
U.S. Appl. No. 14/083,723, filed Nov. 19, 2013, entitled "Decentralized Online Cache Management for Digital Content".

* cited by examiner

*Primary Examiner* — Kieu Oanh T Bui
(74) *Attorney, Agent, or Firm* — Davidson Sheehan LLP (57) ABSTRACT

A server generates a combination of symbols requested by a set of users in response to the symbols requested by each user in the set being cached by the other users in the set. A transmitter in the server multicasts the combination of symbols to the set of users based on a transmission deadline associated with the set of users.

16 Claims, 7 Drawing Sheets

Table 400:

| TIME | 1 | 2 | 3 | 4 | 5 | 6 | 7 | 8 | 9 |
|---|---|---|---|---|---|---|---|---|---|
| USER 1 | A1 |  | A2 |  |  |  |  | A3 |  |
| USER 2 |  | B1 |  |  | B2 |  |  |  | B3 |
| USER 3 |  |  |  | C1 |  | C2 | C3 |  |  |

Table 405:

| TIME | 1 | 2 | 3 | 4 | 5 | 6 | 7 | 8 | 9 |
|---|---|---|---|---|---|---|---|---|---|
| ENTRY 1 | A1 | A1⊕B1 | A1⊕B1 | A2⊕C1 | A2⊕C1⊕B2 | C2 | C2 | C2⊕A3 | C3 |
| ENTRY 2 |  |  | A2 |  |  |  | C3 | C3 | B3 |
| ENTRY 3 |  |  |  |  |  |  |  |  |  |

ASYNCHRONOUS ENCODING OF DIGITAL CONTENT

BACKGROUND

1. Field of the Disclosure

The present disclosure relates generally to communication systems and, more particularly, to asynchronous encoding of digital content conveyed by communication systems.

2. Description of the Related Art

Content providers such as Netflix, Amazon, Hulu, YouTube, and Verizon provide digital content to end-users over wired or wireless communication networks. For example, end-users may watch television shows or movies using video-on-demand or streaming services supported by the content providers. These services are very popular and may consume a significant portion of the bandwidth of the communication network during peak usage. For example, Netflix alone has been estimated to use as much as a third of the bandwidth available in the U.S. between 9 PM and midnight. Caching portions of the digital content before it is requested by end-users may reduce the strain on the network. For example, randomly selected portions of different programs may be prefetched into caches associated with different users before the users choose one or more of the different programs for viewing. If the user then selects one of the programs for viewing, only the un-cached portion needs to be transmitted over the network.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The effectiveness of caching can be increased by prefetching different portions of programs (or other digital content) into caches associated with different users that share the same network connection to the content provider. The portions of the programs can be prefetched into the different caches so that the caches hold complementary portions of the programs. For example, if the content provider is providing two programs (A, B) that are each divided into two portions ($A_1$, $A_2$, $B_1$, $B_2$), the cache associated with a first user may hold the portions ($A_1$, $B_1$) and the cache associated with a second user may hold the complementary portions ($A_2$, $B_2$). Then, if the users request different programs, the content provider can transmit linear combinations of the complementary portions cached in different caches over the shared network connection to the users. The users can use their cached portion to invert the linear combination and retrieve the un-cached portion of their requested programs. For example, if the first user requests program A and the second user requests program B, the content provider can transmit a linear combination such as $A_2 \oplus B_1$ (where $\oplus$ represents the exclusive-OR (XOR) operation) over the shared network connection. The first user can retrieve the portion $A_2$ using the cached portion $B_1$ to invert the linear combination ($A_2 \oplus B_1 \oplus B_1 = A_2$) and the second user can retrieve the portion $B_1$ using the cached portion $A_2$ to invert the linear combination ($A_2 \oplus B_1 \oplus A_2 = B_1$). The bandwidth needed to transmit the linear combination is half the bandwidth required to transmit the two portions $A_2$ and $B_1$ separately.

Time-sensitive or delay-sensitive services such as video-on-demand or other streaming services must satisfy two basic constraints. First, the service must be able to respond to asynchronous user requests because users can request content (such as a movie or television program) at any time and at any point within the content, as well as being able to rewind or fast-forward through the content. Second, the service must be able to provide the requested content within a time interval set by the delay sensitivity of the user. For example, when a program begins and a user is buffering the beginning of the program, the user may abandon the program if the user does not receive responses with a latency of less than about 0.5-2 seconds. Once the buffer is full, the required latency may be increased to approximately 30 seconds. However, if the user fast-forwards or rewinds, the program may be re-buffered from its new starting point and the latency may be reduced to a smaller value such as 0.5-2 seconds until the re-buffering is complete. Some embodiments of the techniques described above for generating linear combinations of cached portions of data for different users do not account for the delay sensitivity of the different users and consequently are not well-suited for supporting delay sensitive applications.

The bandwidth consumed by delay-sensitive applications, such as video-on-demand and streaming services, can be reduced by generating linear combinations of symbols requested by a set of users when the symbols requested by each user in the set are cached by all of the other users in the set and each user has cached all the symbols requested by the other users. The linear combinations may then be transmitted prior to a minimum deadline requested by the users. In some embodiments, a service provider can maintain a queue to store symbols or linear combinations of symbols requested by users. For example, the queue may store a first symbol that represents a portion of a program requested by a first user. A linear combination of the first symbol and a second symbol that represents a portion of a program requested by a second user may be formed and stored in the queue if the first user has cached the second symbol and the second user has cached the first symbol. This process can be repeated to incorporate symbols requested by subsequent users into the linear combination as long as the symbol requested by the subsequent user is cached by all the previously-incorporated users and all the symbols requested by the previously-incorporated users are cached by the subsequent user. The linear combination can then be transmitted to the first user, the second user, and any subsequently-incorporated users prior to a deadline requested by the first user, the second user, or the subsequently-incorporated users. Some embodiments may use a sequential rule to decide whether to form a linear combination of a requested symbol and a symbol or linear combination of symbols in a queue entry by comparing the requested symbol and cached symbols for a requesting user to the requested symbols and cached symbols for users associated with the queue entries.

Figure 1:
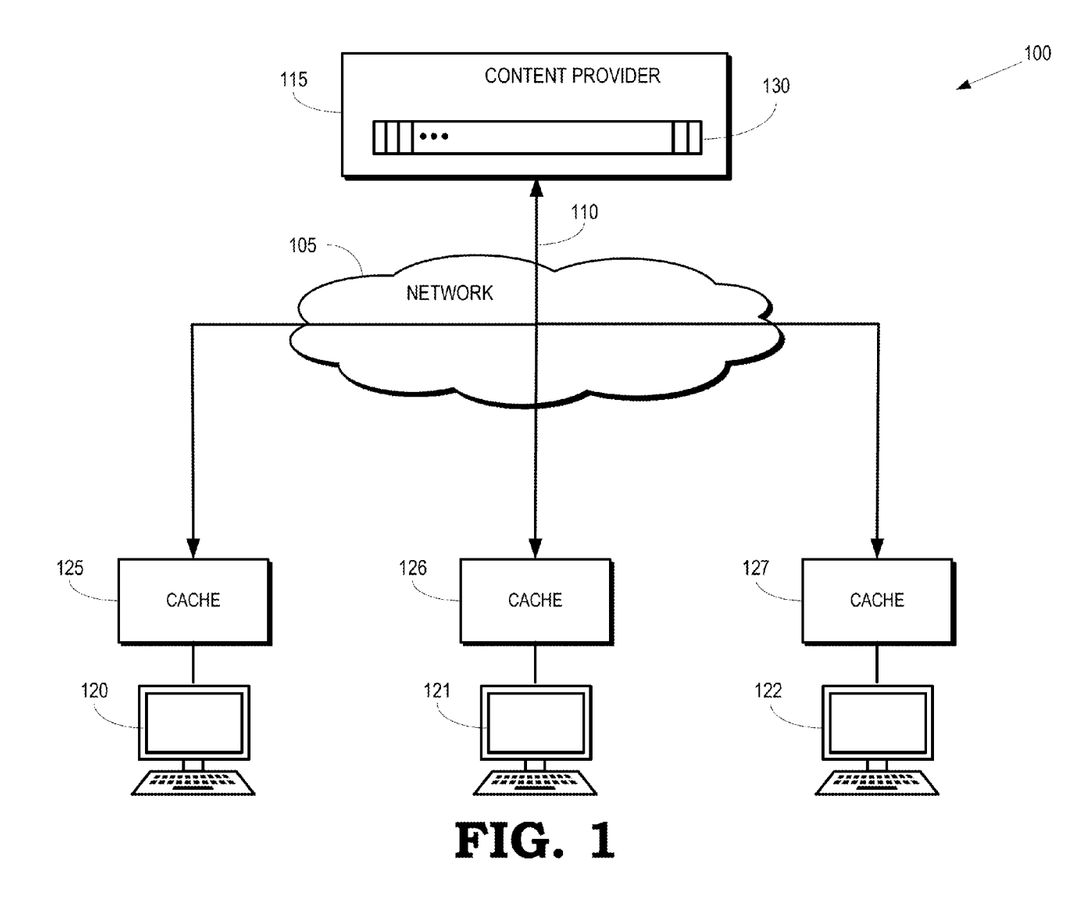
FIG. 1 is a block diagram of a communication system according to some embodiments.

FIG. 1 is a block diagram of a communication system 100 according to some embodiments. The communication system 100 includes a network 105 that supports a network connection 110 between a content provider 115 and a plurality of users 120, 121, 122 (collectively referred to as the "users 120-122"). The term "user" may refer to a device that transmits or receives information over the network connection 110, such as a desktop computer, laptop computer, tablet computer, a smart phone, or smart television, as well as the person that is using the device. Furthermore, each of the users 120-122 shown in FIG. 1 may represent a single user or a plurality of users. In the interest of clarity, FIG. 1 depicts one content provider 115, one connection 110 and three users 120-122. However, some embodiments of the communication system 100 may include different numbers of these elements. For example, the communication system 100 may include hundreds, thousands, or millions of users 120-122. For another example, the communication system 100 may include multiple content providers 115 and the content providers 115 may be implemented using a plurality of servers that may be geographically dispersed. Embodiments of the network 105 or the network connection 110 may be implemented using wired connections, wireless connections, or any combination thereof.

The users 120-122 are associated with corresponding caches 125, 126, 127 (collectively referred to as "the caches 125-127") that are used to store information received from the content provider 115. Caching of the information received from the content provider may be performed before, after, or concurrently with providing this information to the users 120-122. Some embodiments of the caches 125-127 include cache entries or cache lines and each cache entry or line may store a segment of a block of digital content received from the content provider. For example, as discussed in detail herein, the caches 125-127 may be able to store segments of blocks of digital content selected from the blocks of digital content that are transmitted over the network connection 110.

Blocks, segments of blocks, or combinations of segments of blocks of digital content may be transmitted over the network connection 110 in response to requests for the blocks from one or more of the users 120-122. As used herein, the term "symbol" is used to refer to a portion of information that is requested by one of the users 120-122 for transmission by the content provider 115. Thus, a requested symbol may include blocks, a segment or portion of a block, a combination of segments of blocks, or other parts of the digital content provided by the content provider 115.

Symbols may be pre-provisioned to the caches 125-127 or the caches 125-127 may cache symbols that were previously transmitted to the corresponding user 120-122. For example, the caches 125-127 may select and store transmitted symbols based on criteria including fullness of the caches 125-127, a number of symbols cached in the caches 125-127, and ages of symbols that are cached in the caches 125-127. The cache selection process may therefore be referred to as a dynamic process or an "online" process because the caches 125-127 select symbols concurrently with provision of the digital content to the users 120-122. For example, the caches 125-127 may select and cache symbols that represent a television show that is currently being watched by the user 122. The cache selection process may also be referred to as a "decentralized" process because the caches 125-127 may not communicate with each other and each cache 125-127 can independently select and cache symbols that are being conveyed over the network connection 110. Consequently, the sets of symbols stored in the caches 125-127 may evolve and change as different programs are requested by the users 120-122. Furthermore, the caches 125-127 may store different and complementary sets of symbols that have been requested by the users 120-122, which may provide opportunities to reduce the volume of data transmitted over the network connection 110 by transmitting linear combinations of the symbols stored by the different caches 125-127, as discussed herein.

Some embodiments of the content provider 115 may reduce the network resources consumed by symbol transmissions by forming linear combinations of the requested symbols. For example, the content provider 115 may generate linear combinations of symbols requested by the set of users 120-122 when each symbol requested by one of the users 120-122 in the set is cached by all of the other users 120-122 in the set and each user 120-122 has cached all the symbols requested by the other users 120-122 in its associated cache 125-127. Some embodiments of the content provider 115 may form the linear combination by performing an exclusive-OR of symbols requested by the users 120-122. This process may be referred to as "coding" or "encoding" the symbols for transmission over the network 105. Symbols and linear combinations of symbols may be stored in entries of a queue 130 and the symbols or the linear combinations may then be transmitted prior to a minimum deadline requested by the users 120-122 or prior to some other time indicated by transmission deadlines requested by the users 120-122. Upon reception of the linear combination, the users 120-122 may reconstruct (or "decode") their requested symbols using their cached symbols.

Figure 2:
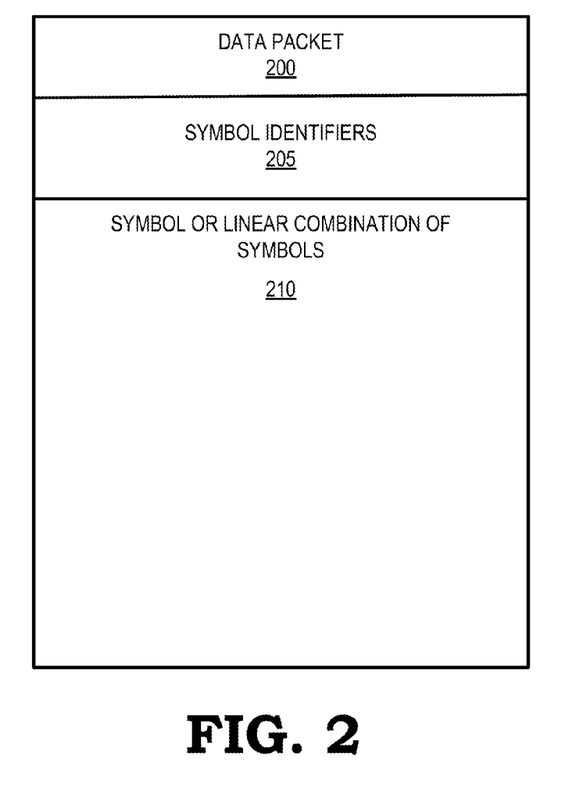
FIG. 2 is a diagram of an example of a data packet that can be used to transmit linear combinations of symbols according to some embodiments.

FIG. 2 is a diagram of an example of a data packet 200 that can be used to transmit linear combinations of symbols according to some embodiments. Some embodiments of the data packet 200 include information identifying the symbols that contribute portions of the linear combinations transmitted by the data packet 200. The identifying information may be transmitted in a header that includes symbol identifiers 205 that identify the different symbols represented in the linear combinations. For example, a header including symbol identifiers 205 may include information identifying programs A and B if the invertible combination includes symbols from programs A and B such as $A_2$ and $B_1$. The data packet 200 may also include linear combinations 210 of symbols. For example, the data packet 200 may include a linear combination 210 such as $A_2 \oplus B_1$.

Figure 3:
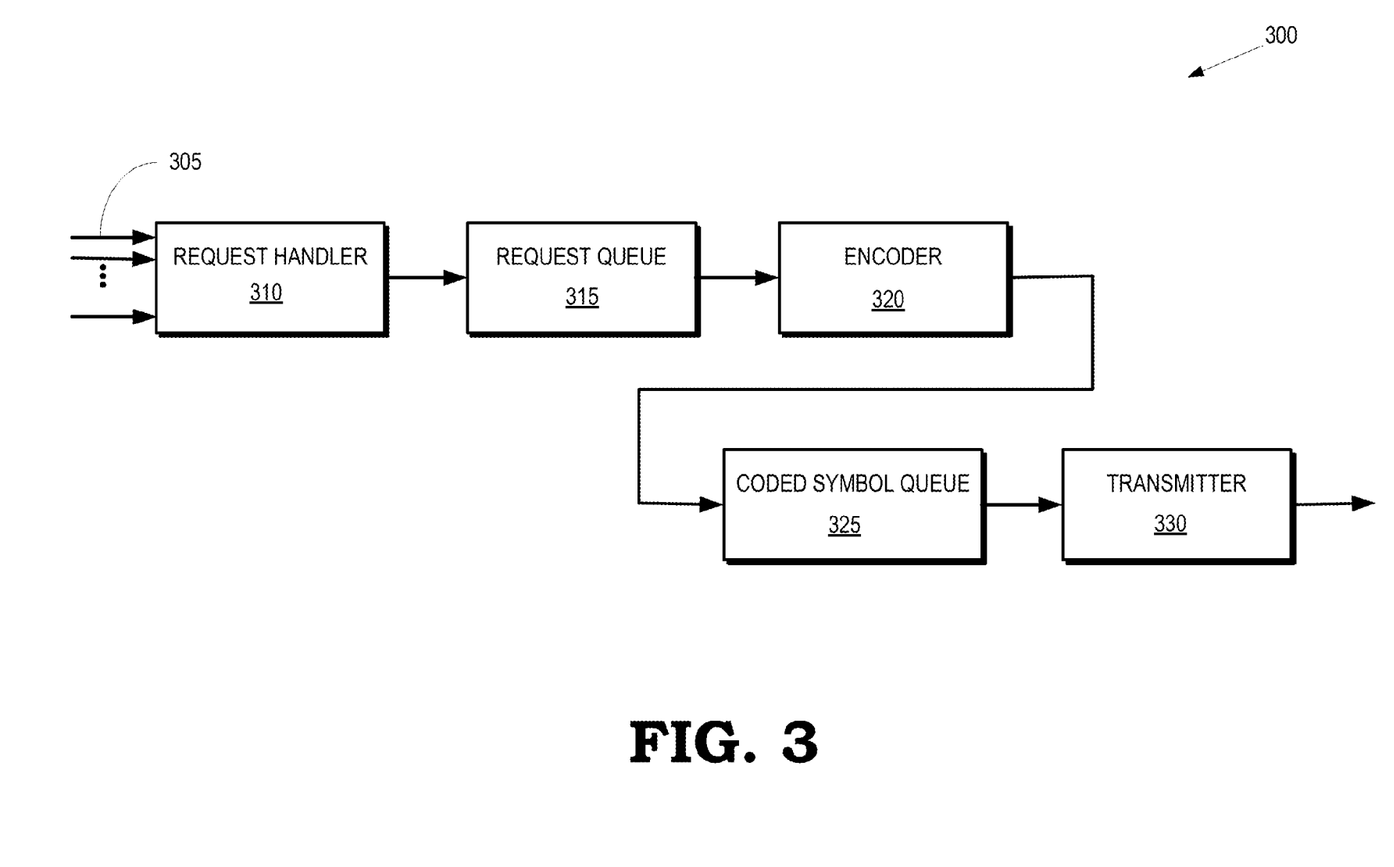
FIG. 3 is a block diagram of a server for providing coded symbols in response to user requests according to some embodiments.

FIG. 3 is a block diagram of a server 300 for providing coded symbols in response to user requests according to some embodiments. Content providers such as the content provider 115 shown in FIG. 1 may implement one or more servers 300 to provide coded symbols to users such as the users 120-122 shown in FIG. 1. In the illustrated embodiment, files including digital content that represent requested programming, such as multimedia programming, television programming, films, live broadcast, and the like, may be stored by the server 300 or at an external location. The files may be split into a sequence of symbols of a fixed size (e.g., a size that may range from 1 kB to 10 kB). User requests may then be translated into symbol requests, which may allow the users to skip over content, ask for content at locations within the program, fast-forward, rewind, or perform other operations.

Requests 305 from different users arrive asynchronously at a request handler 310. Some embodiments of the request handler 310 may read requests 305 from a plurality of open network connections or sockets. The request handler 310 may then add the arriving requests 305 to entries of a request queue 315. The request queue 315 includes entries to hold pending requests 305 and may be implemented as a first-in-first-out (FIFO) queue. New requests 305 may therefore be added to the tail of the request queue 315 and previously queued requests 305 may be removed from the head of the request queue 315. For example, the request handler 310 may add the most recent request 305 to an entry at the tail of the request queue 315.

The server 300 includes an encoder 320 that may form linear combinations of requested symbols and symbols or linear combinations of symbols stored in a coded symbol queue 325. Some embodiments of the queue 130 shown FIG. 1 may be implemented using the coded symbol queue 315. The encoder 320 may be able to remove requests from the entry at the head of the request queue 315 or, if the request queue 315 is empty, the encoder 320 may block further processing until a new request 305 is added to the request queue 315. The encoder 320 can read the symbol requested by the request 305, e.g., from a memory location in the server 300 or from an external memory device. The encoder 320 may then iterate over the entries of the coded symbol queue 325 to determine whether the requested symbol can be coded with a symbol or linear combination of symbols stored in one of the entries of the coded symbol queue 325, as discussed herein. Some embodiments of the encoder 320 iterate over the entries of the coded symbol queue 325 according to a sequential rule. For example, the encoder 320 may iterate over the entries in a sequence based on the transmission deadlines associated with the entries so that entries corresponding to an earliest minimum deadline for transmitting a symbol or linear combination of symbols in the entry are accessed first and entries corresponding to the latest minimum deadline are accessed last. However, other sequences that are a function of the transmission deadlines may also be used. If the requested symbol did not satisfy the criteria for coding with information in any existing entry of the coded symbol queue 325, the encoder 320 may create a new coded content symbol containing only the requested symbol and add it to an entry at the tail of the coded symbol queue 325.

The coded symbol queue 325 includes entries to hold a list of coded symbols, which may include a single symbol or a linear combination of symbols. Some embodiments of the coded symbol queue 325 may be implemented as a FIFO queue 325 and therefore coded symbols may be added to an entry at the tail of the coded symbol queue 325 and removed from the entry at the head of the coded symbol queue 325. Each entry is associated with a transmission deadline for the coded symbol and entries in the coded symbol queue 325 may be ordered according to the transmission deadline. The coded symbols may only be removed from the coded symbol queue 325 after remaining in the coded symbol queue 325 for an amount of time determined by the transmission deadline. For example, an entry at the head of the coded symbol queue 325 may be removed when the current time is equal to the transmission deadline.

The server 300 includes a transmitter 330 that can remove coded symbols from entries at the head of the coded symbol queue 325. If the coded symbol queue 325 is empty or the entry at the head of the coded symbol queue 325 does not satisfy the condition for removal indicated by its transmission deadline, the transmitter 330 may block further processing until a coded symbol at the head of the coded symbol queue 325 is eligible for transmission. The transmitter 330 may also determine the members of a multicast group that includes the set of users that requested symbols that were coded together in the entry that is ready for transmission. The transmitter 330 may then multicast or broadcast the coded symbol over the network to the set of users in the multicast group. In some embodiments, in response to expiration of the transmission deadline of a request in the entry at the head of the coded symbol queue 325, the coded symbol queue 325 may be searched to determine the largest set of requests in the coded symbol queue 325 that can be coded together with the expiring request. If any such requests are found, the transmitter 330 may remove the requests from the coded symbol queue 325. The removed requests may be merged with the expiring request and the transmitter 330 may multicast the resulting merged request to the set of users corresponding to the merged request.

Figure 4:
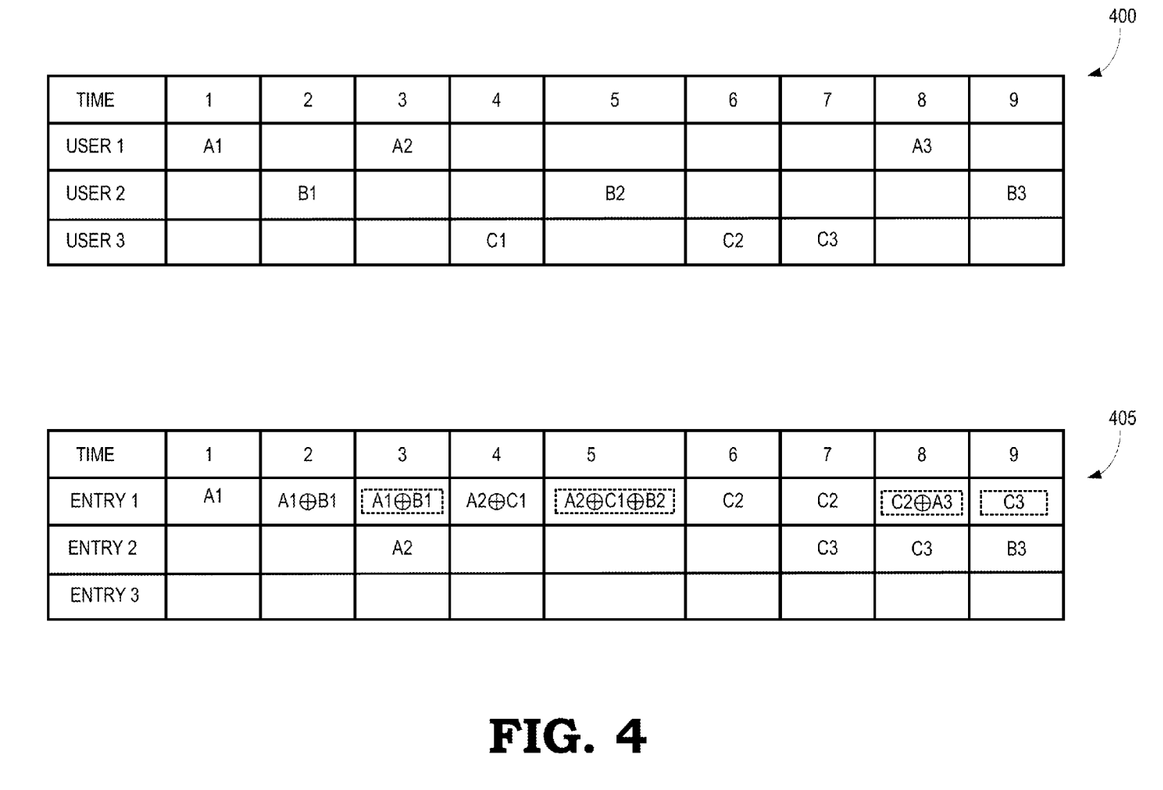
FIG. 4 is a diagram of a sequence of user requests and a corresponding coded symbol queue of a server according to some embodiments.

FIG. 4 is a diagram of a sequence 400 of user requests and a corresponding coded symbol queue 405 of a server according to some embodiments. The coded symbol queue 405 may be used as the coded symbol queue 325 shown in FIG. 3. Time is measured in arbitrary units increasing from left to right as indicated by the numerals 1-9, which may refer to cycles, timeslots, or other time intervals. The sequence 400 depicts user requests from three users (User 1, User 2, and User 3) in each of the time intervals. The coded symbol queue 325 has at least three entries (Entry 1, Entry 2, and Entry 3) that can store symbols or linear combinations of symbols prior to transmission. The entries are associated with a corresponding transmission deadline, which is set to three time intervals for each of the entries. Thus, a symbol or a linear combination of symbols may remain in an entry of the coded symbol queue 405 for a maximum of three time intervals, after which the symbol or linear combination of symbols in the entry is to be transmitted. Some embodiments may use other definitions of the transmission deadline, such as a transmission deadline that indicates that the entry is to be transmitted when the transmission deadline is equal to a current time, and different transmission deadlines may be associated with different entries, as discussed herein.

At time interval 1, User 1 requests transmission of symbol A1. The server determines that the coded symbol queue 405 is empty and thus there are no opportunities for coding the requested symbol A1 with a previously requested symbol. The requested symbol A1 is therefore added to Entry 1 of the coded symbol queue 405.

At time interval 2, User 2 requests transmission of symbol B1. The server determines (using embodiments of the techniques described herein) that the symbol B1 may be coded with the previously requested symbol A1. For example, the server may determine that User 1 has cached the symbol B1 and User 2 has cached the symbol A1. The server may therefore code the symbols A1 and B1, e.g., by forming a linear combination A1⊕B1. In the illustrated embodiment, the symbol "⊕" indicates that the linear combination is an exclusive-OR operation, although linear combinations over fields larger than the binary field or functions other than linear combinations may also be used. The linear combination is then stored in Entry 1 of the coded symbol queue 405.

At time interval 3, User 1 requests transmission of symbol A2. The server determines that the symbol A2 is not eligible for combination with the linear combination A1⊕B1 because the symbols A1 and A2 were both requested by User 1, which does not have a cached copy of either symbol. The symbol A2 may therefore be stored in Entry 2 of the coded symbol queue 405. The symbol A1 will have been in the coded symbol queue 405 for three time intervals at the expiration of time interval 3. The linear combination A1⊕B1 may therefore be removed from the coded symbol queue 405 and transmitted at the end of time interval 3, as indicated by the dashed box around the linear combination A1⊕B1.

At time interval 4, User 3 requests transmission of symbol C1. The server determines (using embodiments of the techniques described herein) that the symbol C1 may be coded with the previously requested symbol A2. For example, the server may determine that User 1 has cached the symbol C1 and User 3 has cached the symbol A2. The server may therefore code the symbols A2 and C1 by forming a linear combination A2⊕C1. The linear combination is then stored in Entry 1 of the coded symbol queue 405.

At time interval 5, User 2 requests transmission of symbol B2. In FIG. 4, the box representing the time interval 5 is larger than the boxes for other time intervals to accommodate the notation. This does not necessarily indicate that the time interval 5 is different than any other time intervals. The server determines (using embodiments of the techniques described herein) that the symbol B2 may be coded with the linear combination A2⊕C1. For example, the server may determine that User 1 has cached the symbols B2 and C1, User 2 has cached the symbols A2 and C1, and User 3 has cached the symbols A2 and B2. The server may therefore code the symbol B2 by forming a linear combination A2⊕C1⊕B2. The symbol A2 will have been in the coded symbol queue 405 for three time intervals at the expiration of time interval 5. The linear combination A2⊕C1⊕B2 may therefore be removed from the coded symbol queue 405 and transmitted at the end of time interval 5, as indicated by the dashed box around the linear combination A2⊕C1⊕B2.

At time interval 6, User 3 requests transmission of symbol C2. The server determines that the coded symbol queue 405 is empty and thus there are no opportunities for coding the requested symbol C2 with a previously requested symbol. The requested symbol C2 is therefore added to Entry 1 of the coded symbol queue 405.

At time interval 7, User 3 requests transmission of symbol C3. The server determines that the symbol C3 is not eligible for combination with C2 because both symbols were requested by User 3, which does not have cached copies of either symbol. The symbol C3 may therefore be stored in Entry 2 of the coded symbol queue 405.

At time interval 8, User 1 requests transmission of symbol A3. The server determines (using embodiments of the techniques described herein) that the symbol A3 may be coded with the symbol C2. For example, the server may determine that User 1 has cached the symbol C2 and User 3 has cached the symbol A3. The server may therefore code the symbols by forming a linear combination C2⊕A3. The symbol C2 will have been in the coded symbol queue 405 for three time intervals at the expiration of time interval 8. The linear combination C2⊕A3 may therefore be removed from the coded symbol queue 405 and transmitted at the end of time interval 8, as indicated by the dashed box around the linear combination C2⊕A3.

At time interval 9, User 2 requests transmission of symbol B3. The server determines that the symbol B3 is not eligible for combination with C3. For example, User 2 may not have a cached copy of the symbol C3 or User 3 may not have a cached copy of the symbol B3. The symbol B3 may therefore be stored in Entry 2 of the coded symbol queue 405. The symbol C3 will have been in the coded symbol queue 405 for three time intervals at the expiration of time interval 9. The symbol C3 may therefore be removed from the coded symbol queue 405 and transmitted at the end of time interval 9, as indicated by the dashed box around the symbol C3.

In some embodiments, a server such as one or more servers implemented by the content provider 115 shown in FIG. 1 or the server 300 shown in FIG. 3 may utilize various criteria or thresholds to determine whether symbols requested by one set of users may be coded and transmitted together with symbols requested by another set of users.

The user requests may be represented by a triple (k, S, t), where $k \in \{1, 2, \ldots, K\}$ is the user requesting the symbol, $S \subset \{1, 2, \ldots, K\}$ is the subset of users that have already cached the requested symbol in their cache, and t is the transmission deadline that indicates when the request is to be served. The transmission deadline t is assumed to be an integer that represents an arbitrary time interval such as milliseconds, but other embodiments may use other deadlines. The triple (k, S, t) may be written (k, S) if the value of the deadline is not material. In this notation, the identifier of the actual symbol requested by the user is suppressed. Furthermore, each request (k, S) satisfies the property $k \notin S$ because otherwise the request could be satisfied by a symbol cached by the requesting user.

The video server may create coded multicasting opportunities for different users requesting symbols for a streaming application. For example, three users may issue a sequence of requests:

(1; 2, 3) (2; 1) (2; 1, 3) (3; 1, 2) (1; 2)

The first request is from user 1 and indicates that users 2, 3 have cached the requested symbol, the second request is from user 2 and indicates that user 1 has cached the requested symbol, etc.

The video server can satisfy requests $(k_1, S_1, t_1)$, $(k_2, S_2, t_2)$, $\ldots$, $(k_L, S_L, t_L)$ using a single coded multicast transmission if the symbols requested by each user in the set of requesting users are cached by all of the other users in the set and each user has cached all the symbols requested by the other users. This condition may be represented as:

$$k_\ell \in \bigcap_{j \neq \ell} S_j$$

for all $l \in \{1, 2, \ldots, L\}$. The coded transmission can be interpreted as a request by users $$K = \{k_1, k_2, \ldots, k_L\}$$

with shared cache content $$S = \bigcap_{\ell=1}^{L} S_\ell$$

and a request deadline of:

$$t = \min_{\ell \in \{1,2,\ldots,L\}} t_\ell.$$

The shared request can therefore be indicated as $(K, S, t)$. In some embodiments, other functions (besides a minimum function) of the transmission deadlines may be used to determine the request deadline.

Two shared requests $(K_1, S_1, t_1)$ and $(K_2, S_2, t_2)$ can be merged so that they can be satisfied by a single coded multicast transmission from the video server if $K_1 \subset S_2$ and $K_2 \subset S_1$. The merged request may then be represented as:

$$(K_1 \cup K_2; S_1 \cap S_2; \min\{t_1, t_2\}).$$

The video server may transmit the coded multicast packet including the linear combination of symbols when the current time is equal to the transmission deadline of the merged request. As discussed herein, linear combinations of symbols associated with the merged requests may be stored in a queue that is maintained by the video server. In some embodiments, other functions (besides a minimum function) of the transmission deadlines may be used to determine the request deadline for the merged requests.

The size of the queue is a matter of design choice but may be quite large. For example, the server queue may have approximately 10³ (unmerged) requests at any time for an HTTP adaptive streaming application with 100 users, a video rate of 100 kb per second, a delay tolerance of two seconds, and the a size of 10 kB. For another example, the server queue may have approximately 10⁶ (unmerged) requests at any time for a progressive download video-on-demand application with 600 users, a video rate of 1800 kb per second, a delay tolerance of 30 seconds, and a symbol size of 4 kB. For yet another example, the server queue may have approximately 10⁹ (unmerged) requests at any time for a complete download video-on-demand application with 1000 users, a video rate of 2400 kb per second, a delay tolerance of 3600 seconds, and a symbol size of 1 kB.

Some embodiments of the video server implement different request merging rules to determine when a newly received request should be merged with an existing request in one of the entries of the queue maintained by the video server. Examples of request merging rules include a first-fit rule, a perfect-fit rule and a τ-fit threshold rule. However, some embodiments of the video server may implement other request merging rules.

The first-fit rule compares the new request to an ordered sequence of requests such as the requests stored in entries of a queue maintained by the video server. The sequence of comparisons follows the ordered sequence of requests. For example, the ordered sequence may include requests $(K_1, S_1, t_1), (K_2, S_2, t_2), \ldots, (K_{L-1}, S_{L-1}, t_{L-1})$, that are ordered based on their transmission deadlines such that $t_1 \leq t_2 \leq \ldots \leq t_{L-1}$. The video server receives a new request for a single symbol $(k_L, S_L, t_L)$, and, in response, the video server traverses its queue starting from $l=1$ to find the first request $(K_l, S_l, t_l)$, (i.e., the request with the tightest deadline) that can be merged with the new request so that the following conditions hold:

$k_L \in S_l,$ $K_l \subset S_L.$

The newly merged request may be represented as:

$(K_l \cup \{k_L\}; S_l \cap S_L; \min\{t_l, t_L\}).$

If the video server is not able to find a request that satisfies the conditions, the new request $(k_L, S_L, t_L)$ may be added to the server queue, e.g., to the tail of the server queue.

The perfect-fit rule incorporates additional criteria for merging requests relative to the first-fit rule. In response to receiving a new request for a single symbol $(k_L, S_L, t_L)$, the video server traverses its queue starting from $l=1$ to find the first request $(K_l, S_l, t_l)$, (i.e., the request with the tightest deadline) that can be merged with the new request so that the following conditions hold:

$k_L \in S_l,$ $K_l \subset S_L,$ $S_L \cup K_l = S_l \cup k_L.$

The first two conditions ensure that the two requests under consideration can be merged, as discussed herein. The third condition stipulates that the merging should be optimal in terms of the size of the intersection of cache availability $S_1 \cap S_2$ of the merged request.

The perfect-fit rule may be nearly optimal in a large queue regime ($L \to \infty$) because the probability that there is a queued request that satisfies all three merging conditions increases as the queue length increases and the third condition ensures that the server bandwidth is minimized. The first-fit rule may be nearly optimal in the small queue regime ($L \to 0$).

The τ-fit threshold rule is used to merge requests by comparing measures of a size (or cardinality) of a set of symbols that would be cached by the users associated with the merged request. Mergers that produce a larger set of commonly cached symbols have a higher probability of subsequently being merged with additional requests, whereas mergers that produce a smaller set of commonly cached symbols have a lower probability of subsequent merger with new requests. For example, if the users associated with a merger request do not have any cached symbols in common, no new requests can be merged with the previously merged request. Some embodiments may therefore define a misfit function for the potential merger of two requests $(K_1, S_1, t_1)$ and $(K_2, S_2, t_2)$:

$$\rho((K_1; S_1), (K_2; S_2)) \triangleq \begin{cases} |S_1 \backslash (S_2 \cup K_2)| + |S_2 \backslash (S_1 \cup K_1)|, & \text{if } K_1 \subset S_2 \text{ and } K_2 \subset S_1 \\ \infty, & \text{otherwise.} \end{cases}$$

Here, the notation "|·|" denotes the cardinality operator and the notation "\" denotes the set-theoretic difference or relative complement operator. In general, the misfit between two requested mergers is a non-negative number taking values in the set $\{0, 1, \ldots, K-2, K-1, \infty\}$. The first-fit rule may be described as a sequential rule that merges the new request with a queued request with a finite misfit. The perfect-fit rule may be described as a sequential rule that merges the new request with the queued request with zero misfit.

Lower values of the misfit function indicate better fits and a misfit of zero indicates that the fit is optimal. The τ-fit threshold rule may therefore merge two requests $(K_L, S_L, t_L)$ and $(K_1, S_1, t_1)$ when the value of the misfit function is below a threshold value, τ:

$\rho((k_L; S_L), (K_l; S_l)) \leq \tau.$

Sequential rules such as the first-fit rule, the perfect-fit rule, and the τ-fit threshold rule have a number of advantages. First, each queued request is considered only once and each merger determination is based only on information in the request and therefore takes O(1) time to evaluate. Thus, the computational complexity to insert one new request into the server queue is O(L), where L is the queue length. Second, for the same reasons, sequential rules can be easily parallelized. For example, several threads may sequentially traverse the queue in parallel, each handling the merging operation of one new request.

Figure 5:
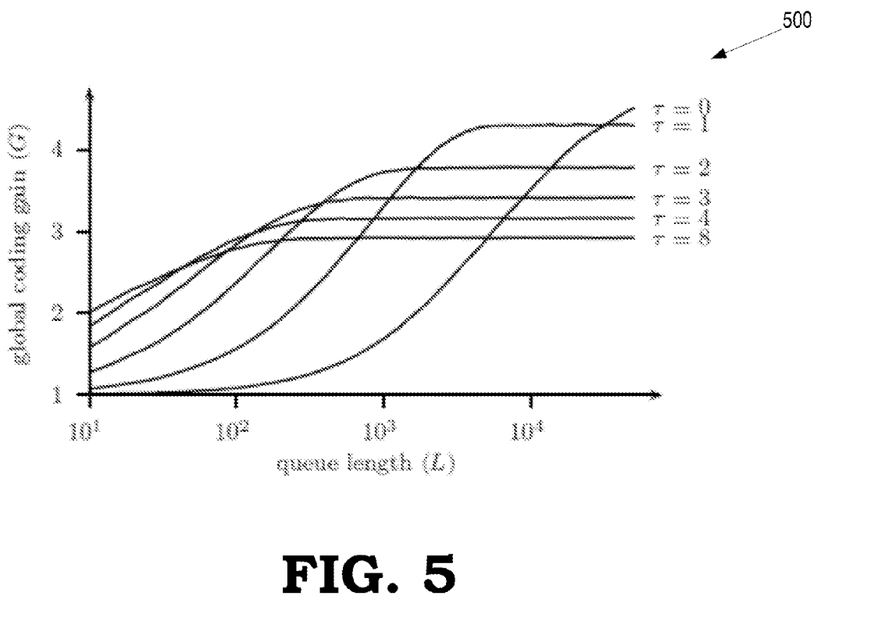
FIG. 5 is a plot illustrating scaling of a global coding gain as a function of the queue length for the $\tau$-fit threshold merging rule according to some embodiments.

FIG. 5 is a plot 500 illustrating scaling of a global coding gain as a function of queue length for a τ-fit threshold rule according to some embodiments. As used herein, the term "global coding gain" is defined as a ratio of the bandwidth for uncoded transmission of a set of symbols and the bandwidth for coded transmission of the set of symbols. The horizontal axis indicates the queue length and the vertical axis indicates the global coding gain. The number of users in the illustrated embodiment is K=10 and a caching probability p, which indicates the fraction of the total content database that is stored in each cache, is set to 0.5. Different curves indicate different values of the threshold. FIG. 5 indicates that the optimal value of the threshold decreases as the length of the queue increases. In the limit that the queue length L→∞, the sequential perfect-fit rule (τ=0) asymptotically achieves a global coding gain of:

$$\frac{Kp}{1-(1-p)^K}$$

where p is the caching probability for K users. For example, for K=10, p=0.5, and L=50,000, the global coding gain achieved by the perfect-fit rule is more than 4.5, corresponding to a server bandwidth reduction of more than 75%. This value is quite close to the limiting value of about 5.0 indicated by the above analytical expression.

Figure 6:
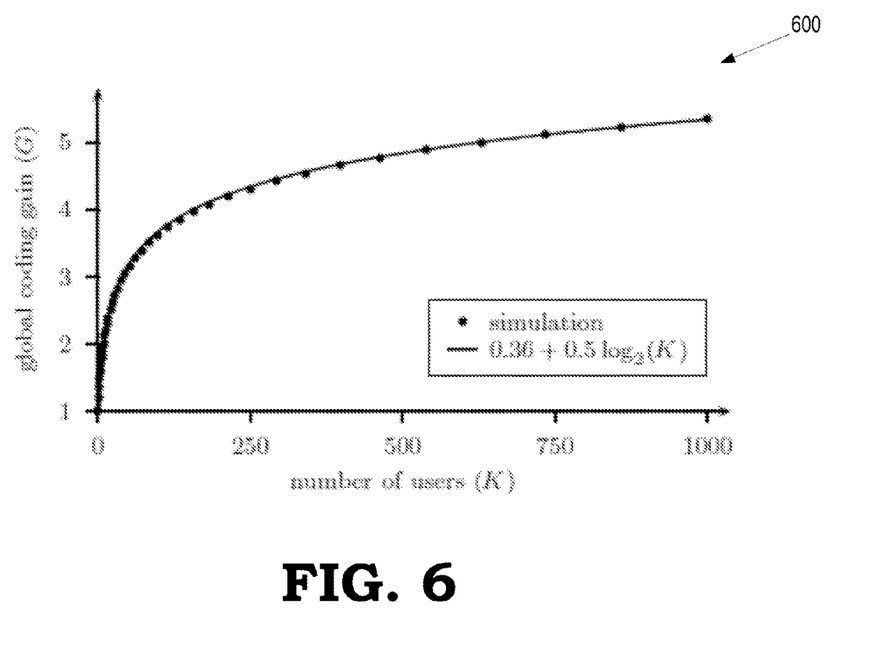
FIG. 6 is a plot illustrating scaling of the global coding gain as a function of the number of users for a system that implements a first-fit merging rule according to some embodiments.

FIG. 6 is a plot 600 illustrating scaling of the global coding gain as a function of the number of users for a system that implements a first-fit merging rule according to some embodiments. The queue length L is set equal to the number of users K, which may correspond to each user having a constant delay requirement for a single outstanding symbol request. The global coding gain illustrated in FIG. 6 can approach a factor of 5.3 for K=1000 users under a first-fit merging rule.

Figure 7:
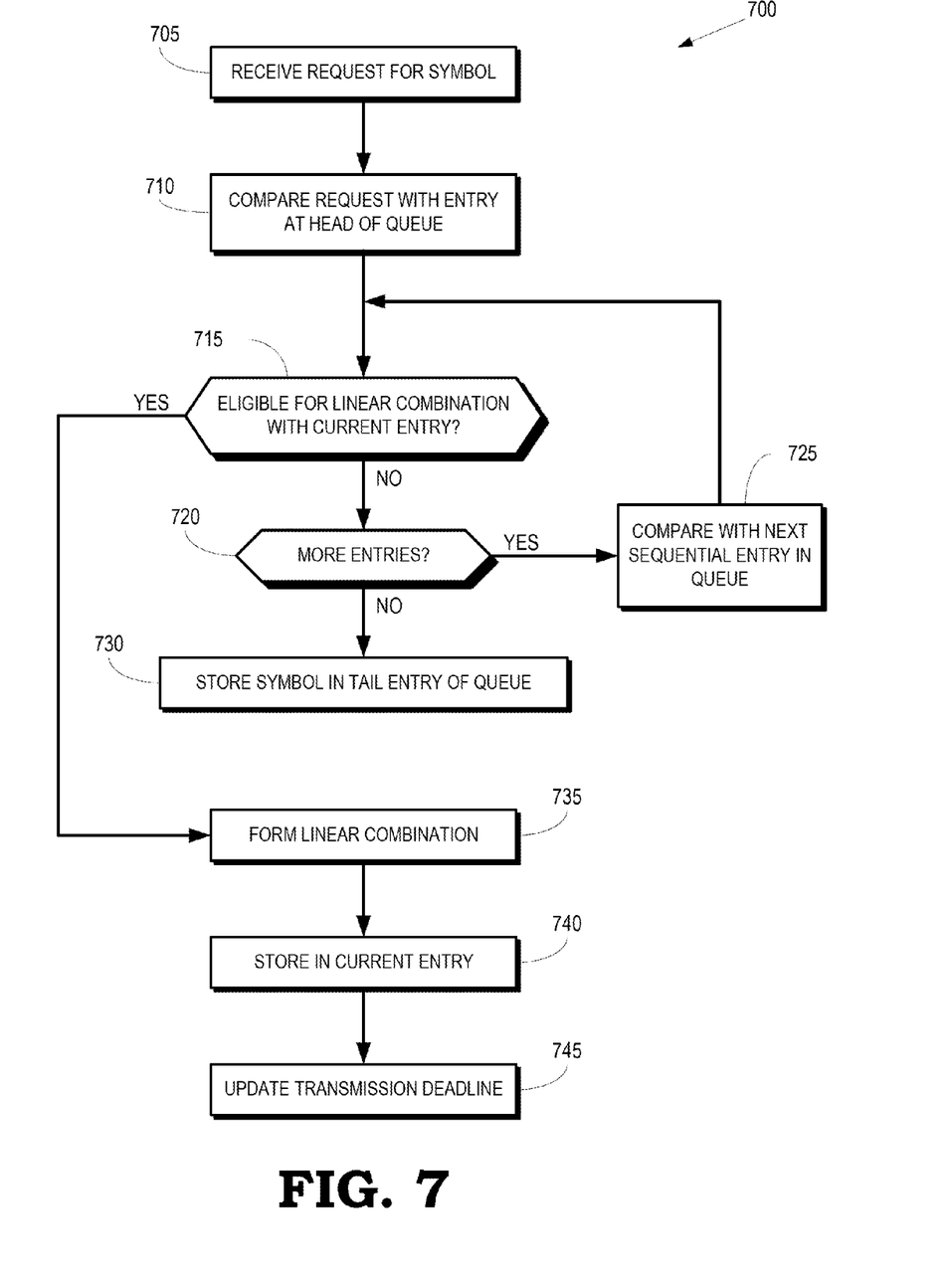
FIG. 7 is a flow diagram of a method for merging new symbol requests with queued symbol requests according to some embodiments.

FIG. 7 is a flow diagram of a method 700 for merging new symbol requests with queued symbol requests according to some embodiments. The method 700 may be implemented in a server such as one or more servers implemented in some embodiments of the content provider 115 shown in FIG. 1 or the server 300 shown in FIG. 3. At block 705, the server receives a request for a symbol from a requesting user. At block 710, the server compares the new request with a previous request associated with an entry at the head of a queue (such as a coded symbol queue) associated with the server. For example, the server may compare the symbol requested by the requesting user to symbols cached by one or more previous requesting users associated with the previous request. The server may also compare the symbols requested by the previous requesting users associated to symbols cached by the requesting user. At decision block 715, the server determines whether the new request is eligible for linear combination with the request associated with the current entry. For example, the server may apply the first-fit rule, the perfect-fit rule, or the τ-fit threshold rule to determine whether the new request is eligible for merging with the previous request. If not, the server determines whether there are more entries in the queue at decision block 720. As long as there are more entries, the server continues to compare the new request with the next sequential entry in the queue at block 725. If there are no more entries, the symbol requested in the new request may be stored in a tail entry of the queue at block 730.

If the new request is eligible for merger with the previous request associated with of the entries of the queue, the server may form a linear combination of the newly requested symbol and a symbol or linear combination of symbols stored in the queue entry at block 735. At block 740, the server stores the new linear combination in the current entry of the queue. At block 745, the server updates the transmission deadline based on a function of the transmission deadlines associated with the new request and the previous request. For example, the transmission deadline for the merged request may be set equal to the shortest (or nearest or earliest) transmission deadline for the new request and the previous request. In the event that modifying the transmission deadline for the merged request results in an entry with a shorter/nearer/earlier deadline being closer to the tail of the queue than an entry with a longer/further/later deadline, some embodiments of the server may also reorder the queue so that the queue is sequentially ordered from shortest (or nearest or earliest) transmission deadline to longest (or furthest or latest) transmission deadline.

Figure 8:
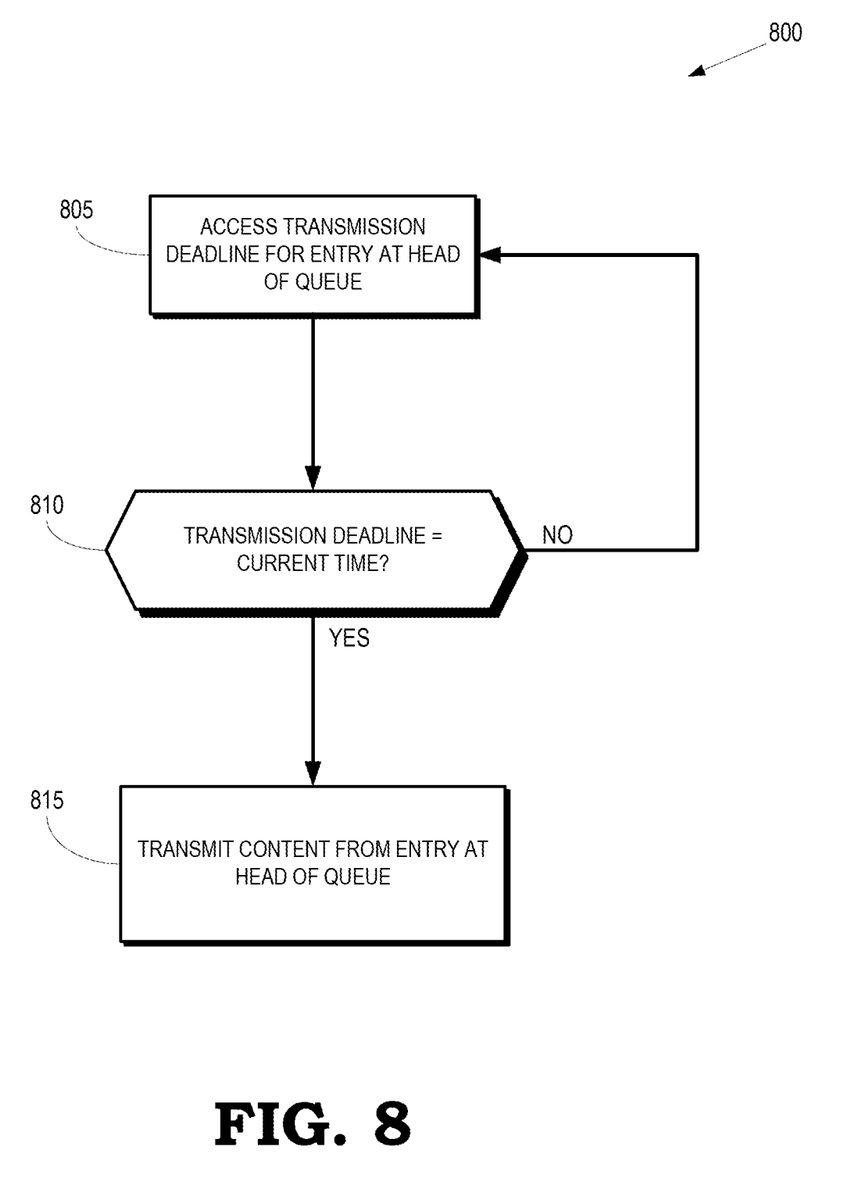
FIG. 8 is a flow diagram of a method for determining whether to transmit a symbol or linear combination of symbols from an entry in a coded symbol queue according to some embodiments.

FIG. 8 is a flow diagram of a method 800 for determining whether to transmit a symbol or linear combination of symbols from an entry in a coded symbol queue according to some embodiments. The method 800 may be implemented in server such as one or more servers implemented in some embodiments of the content provider 115 shown in FIG. 1 or the server 300 shown in FIG. 3. At block 805, the server accesses the transmission deadline associated with an entry at the head of the coded symbol queue. In the illustrated embodiment, the transmission deadline indicates a deadline for responding to the request by transmitting the coded symbols. However, other embodiments may use other formats for the transmission deadline. For example, the transmission deadline may indicate a duration of a time interval that a request is to spend in the coded symbol queue before transmission. At decision block 810, the server determines whether the transmission deadline is equal to the current time. If not, the server may wait and perform the comparison again at a later time. If the current time is equal to the transmission deadline, the server removes the coded symbol from the entry at the head of the queue and transmits the symbol at block 815. For example, the server may multicast the coded symbol to a set of users that requested information represented in the coded symbol, as discussed herein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectro-mechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   generating, at a server, a combination of symbols requested by a set of users in response to the symbols requested by each user in the set being cached by the other users in the set;
   storing the combination in one of a plurality of entries of a queue associated with the server; and
   multicasting the combination of symbols to the set of users based on a transmission deadline associated with the set of users,
   wherein the set of users comprises at least one first user and at least one second user, and further comprising:
   receiving a first request from the at least one first user to transmit at least one first symbol;
   comparing the at least one first symbol to a set of symbols cached by the at least one second user; and
   comparing a set of symbols cached by the at least one first user to a set of symbols requested by the at least one second user.

2. The method of claim 1, further comprising:
   generating the combination of the at least on first symbol and the set of symbols requested by the at least one second user in response to the at least one first symbol being a member of the set of symbols cached by the at least one second user and the set of symbols requested by at least one second user being a subset of the set of symbols cached by the at least one first user.

3. The method of claim 1, further comprising:
   storing the first symbol in another entry of the queue in response to the at least one first symbol not being a member of the set of symbols cached by the at least one second user or the set of symbols requested by at least one second user not being a subset of the set of symbols cached by the at least one first user.

4. The method of claim 1, further comprising:
   computing a misfit function between a set of symbols cached by the at least one first user and the at least one second user, wherein the misfit function is defined based on the at least one symbol requested by the at least one first user, the set of symbols cached by the first user, the set of symbols requested by the at least one second user, and the set of symbols cached by the at least one second user.

5. The method of claim 4, further comprising:
   generating the combination of the at least one first symbol and the set of symbols requested by the at least one second user in response to the misfit function being less than a threshold value.

6. The method of claim 4, further comprising:
   storing the first symbol in another entry of the queue in response to the misfit function being greater than a threshold value.

7. The method of claim 1, further comprising:
   ordering the plurality of entries in the queue based on a function of a plurality of transmission deadlines requested by the set of users; and
   determining whether to generate the combination by comparing user requests to entries of the queue in sequence.

8. The method of claim 1, wherein multicasting the combination to the set of users based on the transmission deadline associated with the set of users comprises multicasting the combination prior to a minimum transmission deadline requested by the set of users.

9. An apparatus, comprising:
   a server to generate a combination of symbols requested by a set of users in response to the symbols requested by each user in the set being cached by the other users in the set;
   a transmitter to multicast the combination of symbols to the set of users based on a transmission deadline associated with the set of users; and
   a queue comprising a plurality of entries to store symbols or combinations of symbols, wherein the set of users comprises at least one first user and at least one second user, and wherein the server is to receive at least one first request from the at least one first user to transmit at least one first symbol, compare the at least one first symbol to a set of symbols cached by the at least one second user, and compare a set of symbols cached by the at least one first user to a set of symbols requested by the at least one second user.

10. The apparatus of claim 9, wherein the server is to generate the combination of the at least one first symbol and the set of symbols requested by the at least one second user in response to the at least one first symbol being a member of the set of symbols cached by the at least one second user and the set of symbols requested by at least one second user being a subset of the set of symbols cached by the first user, and wherein the server is to store the combination in an entry of the queue.

11. The apparatus of claim 9, wherein the server is to store the at least one first symbol in at least one entry of the queue in response to the at least one first symbol not being a member of the set of symbols cached by the at least one second user or the set of symbols requested by at least one second user not being a subset of the set of symbols cached by the first user.

12. The apparatus of claim 9, wherein the server is to compute a misfit function between a set of symbols cached by the at least one first user and the at least one second user, wherein the misfit function is defined based on the at least one symbol requested by the at least one first user, the set of symbols cached by the first user, the set of symbols requested by the at least one second user, and the set of symbols cached by the at least one second user.

13. The apparatus of claim 12, wherein the server is to generate the combination of the at least one first symbol and the set of symbols requested by the at least one second user in response to the misfit function being less than a threshold value.

14. The apparatus of claim 12, wherein the server is to store the at least one first symbol in at least one other entry of the queue in response to the misfit function being greater than a threshold value.

15. The apparatus of claim 9, wherein the server is to order the plurality of entries in the queue based on a function of a plurality of transmission deadlines requested by the set of users and to determine whether to generate the combination by comparing user requests to the plurality of entries of the queue in sequence.

16. The apparatus of claim 9, wherein the transmitter is to multicast the combination prior to a minimum transmission deadline requested by the set of users.

* * * * *